United States Patent
Holler et al.

(10) Patent No.: US 8,605,081 B2
(45) Date of Patent: Dec. 10, 2013

(54) CONVERTING 3D DATA TO HOGEL DATA

(75) Inventors: Wesley A. Holler, Austin, TX (US);
Gary Anthony McElroy, Jr., Austin, TX (US); Michael E. Weiblen, Black Hawk, CO (US); Thomas Lawrence Burnett, III, Austin, TX (US); Mark E. Lucente, Austin, TX (US)

(73) Assignee: Zebra Imaging, Inc., Austin, TX (US)

( * ) Notice: Subject to any disclaimer, the term of this patent is extended or adjusted under 35 U.S.C. 154(b) by 0 days.

(21) Appl. No.: 12/546,049

(22) Filed: Aug. 24, 2009

(65) Prior Publication Data
US 2010/0220098 A1 Sep. 2, 2010

Related U.S. Application Data

(60) Provisional application No. 61/108,549, filed on Oct. 26, 2008.

(51) Int. Cl.
*G06T 15/00* (2011.01)
*G06T 17/00* (2006.01)

(52) U.S. Cl.
USPC .......................................... 345/419; 345/424

(58) Field of Classification Search
None
See application file for complete search history.

(56) References Cited

U.S. PATENT DOCUMENTS

| | | | |
|---|---|---|---|
| 6,330,088 B1 | 12/2001 | Klug et al. | |
| 6,366,370 B1 | 4/2002 | Holzbach et al. | |
| 6,549,308 B1 | 4/2003 | Camahort | |
| 6,631,016 B1 * | 10/2003 | Klug et al. | 359/23 |
| 6,859,293 B2 * | 2/2005 | Klug et al. | 359/4 |
| 6,868,177 B1 | 3/2005 | Camahort | |
| 6,900,904 B1 | 5/2005 | Holzbach | |
| 6,963,431 B2 | 11/2005 | Holzbach et al. | |
| 7,477,252 B2 * | 1/2009 | Chun | 345/427 |
| 2006/0022973 A1 * | 2/2006 | Alcorn et al. | 345/419 |
| 2006/0028479 A1 * | 2/2006 | Chun et al. | 345/531 |
| 2008/0259419 A1 | 10/2008 | Wilson et al. | |

OTHER PUBLICATIONS

Slinger, C.; Cameron, C.; Stanley, M.; , "Computer-Generated Holography as a Generic Display Technology," Computer , vol. 38, No. 8, pp. 46-53, Aug. 2005, doi: 10.1109/MC.2005.260, URL: http://ieeexplore.ieee.org/stamp/stamp.jsp?tp=&arnumber=1492266&isnumber=32069.*
PCT/US2009/062131 Written Opinion and Search Report, Jun. 11, 2010.
PCT/US2009/062134 (related application) Written Opinion and Search Report, Jun. 11, 2010.
PCT/US2009/062136 (related application) Written Opinion and Search Report, Jun. 11, 2010.
Darrel G. Hopper, Reality and Surreality of 3-D Displays: Holodeck and Beyond, Air Force Research Laboratory, Nov. 15, 2000.
Billy Chen, Building a Projection Autostereoscopic Display, Report, Jun. 11, 2002.
Chromium Interactive Rendering System, 2007 Specification.

(Continued)

*Primary Examiner* — Daniel Hajnik
(74) *Attorney, Agent, or Firm* — Chowdhury & Georgakis, P.C.; Georgios A. Georgakis (57) ABSTRACT

Methods and systems for rendering hogels, including notifying one or more rendering nodes that all rendering is complete in response to determining that each of the one or more rendering nodes completes rendering of corresponding one or more subsets of hogel data from 3D data, the rendering nodes being configured to convert the 3D data to the one or more subsets of hogel data.

10 Claims, 7 Drawing Sheets

(56) References Cited

OTHER PUBLICATIONS

Michael W. Halle, Adam B. Kropp, Fast computer graphics rendering for full parallax spatial displays, SPIE, 1997.

Mark E. Holzbach & Michael Klug, Recent Advances in Digital Holographic Displays, proceedings of the 9th Annual Conference on Virtual Systems and Multimedia 2003, Science Center of Montreal, Quebec, Canada, Oct. 15-17, 2003.

* cited by examiner

Fig. 7 cat # CONVERTING 3D DATA TO HOGEL DATA

I. PRIORITY CLAIM

This application claims priority from:
U.S. Provisional Application No. 61/108,549, filed 26 Oct. 2008, entitled "Systems and Methods for Converting 3D Data to Hogel Data" and naming Michael E. Weiblen, et. al, as inventor(s).

The above-referenced patents and/or patent applications are hereby incorporated by reference herein in their entirety.

II. GOVERNMENT CONTRACT STATEMENT

The U.S. Government has a paid-up license in this invention and the right in limited circumstances to require the patent owner to license others on reasonable terms as provided for by the terms of contract No. W91CRB-09-C-0031 awarded by RDECOM.

III. BACKGROUND

The invention relates generally to the field of rendering hogels and particularly to the field of converting 3D data to hogel data.

IV. SUMMARY

In one respect, disclosed is a method for rendering hogels, the method comprising notifying one or more rendering nodes that all rendering is complete in response to determining that each of the one or more rendering nodes completes rendering of corresponding one or more subsets of hogel data from 3D data, the rendering nodes being configured to convert the 3D data to the one or more subsets of hogel data.

In another respect, disclosed is a system for rendering hogels, the system comprising: one or more processors; and one or more memory units coupled to the processor, the system being configured to: notify one or more rendering nodes that all rendering is complete in response to determining that each of the one or more rendering nodes completes rendering of corresponding one or more subsets of hogel data from 3D data, the rendering nodes being configured to convert the 3D data to the one or more subsets of hogel data.

In yet another respect, disclosed is a computer program product stored on a computer operable medium, the computer program product comprising software code being effective to: notify one or more rendering nodes that all rendering is complete in response to determining that each of the one or more rendering nodes completes rendering of corresponding one or more subsets of hogel data from 3D data, the rendering nodes being configured to convert the 3D data to the one or more subsets of hogel data.

Numerous additional embodiments are also possible. In one or more various aspects, related articles, systems, and devices include but are not limited to circuitry, programming, electro-mechanical devices, or optical devices for effecting the herein referenced method aspects; the circuitry, programming, electro-mechanical devices, or optical devices can be virtually any combination of hardware, software, and firmware configured to effect the herein referenced method aspects depending upon the design choices of the system designer skilled in the art.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices, processes, or other subject matter described herein will become apparent in the teachings set forth herein.

In addition to the foregoing, various other method, device, and system aspects are set forth and described in the teachings such as the text (e.g., claims or detailed description) or drawings of the present disclosure.

V. BRIEF DESCRIPTION OF THE DRAWINGS

Other aspects and advantages of the invention may become apparent upon reading the detailed description and upon reference to the accompanying drawings.

Brief description for the additional figures is provided in the detailed description section.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

VI. DETAILED DESCRIPTION

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the terms "couple," "couples," "coupled," or "coupleable" are intended to mean either an indirect or direct electrical or wireless connection. Thus, if a first device couples to a second device, that connection may be through a direct electrical, optical, wireless connection, etc. or through an indirect electrical, optical, wireless connection, etc. by means of other devices and connections.

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

In some embodiments, systems and methods are disclosed for converting 3D data to hogel data for display on a hogel light modulator, for example, storing for later use, etc. As used here, the term 3D data may refer to a variety of data that may be converted into hogel data and displayed on hogel light modulator. Examples of such 3D data include:

computer-generated 3D data multi-2D view data as may be captured, for example, by a 3D camera or by a 2D camera placed in multiple spatial locations; in such embodiments, in addition to other processing, the data may need to be rearranged into hogel data     data with multiple independent 2D views that may be used to represent different 2D views from different observation locations     voxel type data     non-image 3D data; for example, 3D data that may be used in security applications such as holographic encryption     Data for representing holographic elements     Geometric vertex data, such as CAD or architectural models A distribution and synchronization service may be configured, at least partially, to control the conversion of 3D data to hogel data. A distribution and synchronization service may control the overall process and may also facilitate networking, transport, interprocess communication, control, and monitoring. It should be noted that the different services, blocks, units, applications, etc. described here, such as the distribution and synchronization service, are only examples of how a system or systems having the functionality described here may be implemented. Other configurations of services, blocks, units, applications, etc. may be used to implement the same functionality.

In some embodiments, the 3D data may represent 3D graphics commands that may be received directly from a 3D application. Alternatively, the 3D data/commands may be intercepted when a 3D application running on a workstation, for example, issues 3D data/commands in the process of communicating with a local graphics library for the purpose of rendering 2D images on a 2D display attached to the workstation. In some embodiments, for example, the local graphics library may be replaced by an interfacing graphics library configured to receive and process the 3D graphics commands. In some embodiments, the interfacing graphics library may be configured to capture the 3D graphics commands and to send these commands to the distribution and synchronization service. In some embodiments, the interfacing graphics library may also forward the commands to the original destination (such as the local graphics library) in addition to forwarding the commands to the distribution and synchronization service.

In some embodiments, the 3D graphics application may be a graphics client application or end-user application configured to generate 3D content (or 2.5D content). Examples of such applications may include Google Earth, CAD applications, etc. In some embodiments, the 3D application may be an interactive video game executing on a client machine. A single instance of the client application may run on a client workstation, such as a personal computer, for example. The client application typically may be configured to generate 3D content from which a 2D view may be generated for displaying on a 2D conventional display.

In some embodiments, an interactive 3D data source may be generating 3D content that is continuously changing in time and therefore may require appropriate control and synchronization to effectively communicate with the rendering nodes configured to convert 3D content to hogel data. For example, in some embodiments, the 3D data source may wait to send the next set of 3D data (the next video frame, for example), until it is enabled to do so by the distribution and synchronization service.

In some embodiments, the distribution and synchronization service may be configured to receive the 3D data and to distribute the 3D data to one or more rendering nodes that are configured to generate the hogel data that may be displayed by a hogel light modulator or stored for later viewing, for example. In embodiments where the 3D data is computer 3D graphics data, a rendering node may comprise one or more graphics processing units (GPUs) that are configured to render the multiple hogels from the 3D data either in parallel or in series. For additional discussion on hogels and hogel light modulators, please see U.S. patent application Ser. No. 12/258,438, filed 26 Oct. 2008, entitled "Systems and Methods for Calibrating a Hogel Display" and naming Mark E. Lucente as inventor. The above-referenced patent application is hereby incorporated by reference herein in its entirety. In embodiments where other types of 3D data are to be converted into hogel data, other types of appropriate processing devices may be used in the place of graphics processing units as needed.

In some embodiments, multiple rendering nodes may be used in series and/or in parallel. For each set of 3D data, for example, the task of rendering multiple hogels may be distributed to multiple rendering nodes. The different rendering nodes may then process the rendering of the hogels in series or in parallel depending on the number of hogels to be rendered, the number of hogel "beams" per hogel, the processing power of each rendering node, etc. For example, a first set of hogels may be rendered by the rendering nodes and then another set of hogels may be rendered serially after the first set has been processed. Additional sets of hogels may continue being processed serially until all the hogels assigned to that rendering node have been rendered.

In some embodiments, the rendering nodes may be implemented, for example, as backend (server) applications. The applications may run, for example, on embedded hardware in a hogel light modulator. Other configurations are also possible. The rendering nodes may also be implemented, for example, using an atomic computational hardware unit in a hogel light modulator, such as an embedded personal computer.

In some embodiments, the distribution and synchronization service may be configured to control synchronization across the one or more of rendering nodes. In some embodiments, 3D data corresponding to a 3D video frame, for example, is distributed to the one or more rendering nodes. The rendered hogel data, in some embodiments, may then be sent to a hogel light modulator for displaying. To ensure that the rendered hogel data corresponding to a frame arrives at the hogel light modulator substantially concurrently, the rendering nodes may forward the hogel data to the hogel light modulator in response to all the rendering nodes having completed the rendering.

In some embodiments, the distribution and synchronization service may be configured to receive rendering complete commands from each of the rendering nodes, and in response to receiving rendering complete commands from all the rendering nodes, determine that all the rendering has been completed. In some embodiments, the distribution and synchronization service may then issue an all rendering complete command to all the rendering nodes in response to receiving the individual rendering complete commands from each rendering node. In response to receiving the all rendering complete command, the rendering nodes may then substantially simultaneously output the rendered hogel data to a hogel light modulator, for example, for displaying a 3D image from the hogel data.

The distribution and synchronization service may also be configured to send an all output complete command to the 3D data source to notify the 3D data source that the distribution and synchronization service is ready for additional 3D data (the next video frame, for example). In some embodiments, the distribution and synchronization service may determine that all output is complete in response to each rendering node forwarding an output complete command to the distribution and synchronization service after the each rendering node outputting the hogel data. The distribution and synchronization service, in response to collecting the individual output complete commands, may then issue an all output complete command to the 3D data source. In some embodiments, the 3D data source may then send additional 3D data, such as 3D data corresponding to the next frame, for example.

In other embodiments, 3D data source may be configured to send additional 3D data upon receiving the "all rendering complete" command from the distribution and synchronization service.

In some embodiments, some of the methods and system described here may be configured to display 3D content and collect feedback from a dynamic 3D system consisting of many individual computational nodes connected by a network. Such a system may be extensible so as to allow the incorporation of any number of nodes as well as additional functionality. In embodiments where 3D graphics data may be used, the system may be configured to capture 3D graphics data and commands (such as OpenGL and DirectX) from any 3D application and route and interpret the data across the individual nodes of the system to display a cohesive 3D image using a hogel light modulator, matching the data from the application.

In some embodiments, the system may establish and maintain a topological graph of all the components. This topology may be, for example, an acyclical, directed graph of nodes and distribution and synchronization service instances, such as multiple instances of the distribution and synchronization service. For example, two distribution and synchronization service instances could provide a tunnel through the Internet.

In some embodiments, the system may abstract the topology of the computational components so that the system can appear and function as a single device to client-side applications. For example, the system may be implemented as a cluster of embedded personal computers. Specific control of the sub-components of a display may be provided for a subset of applications when necessary (such as calibration, for example).

In some embodiments, the system may abstract the implementations of the underlying networking protocols, hardware, and topologies. Client applications, for example, may interface with the system with a high level streaming interface and the distribution and synchronization service itself may be transparent. I/O transport, flow control, state tracking, and error detection and recovery may be handled by the distribution and synchronization service.

In some embodiments, the system may be impartial to the content that is routed through the distribution and synchronization service, while providing mechanisms for controlling specific functionality such as synchronization. These additional functions may be enabled by efficiently inspecting transport streams, command interfaces, and the overall system state.

In some embodiments, the distribution and synchronization service may be designed to run on a client workstation as a background service. For example, the distribution and synchronization service may run as a device driver for a 2D display. Issues related to establishing and maintaining network connections may be hidden from the client application. Connections between the display and the client may be initiated by the rendering nodes (servers, for example) to the distribution and synchronization service, thereby minimizing complexity as well as computational load and resource allocation for the client workstation.

In some embodiments, the distribution and synchronization service may function as a persistent service that operates independently from client and render-side software. Launching a client application, for example, may be done independent of the state of the system/display.

In some embodiments, the distribution and synchronization service may arbitrate connectivity, application usage, etc. For example, the service may not permit multiple client applications from attempting to use the display simultaneously, or the service may arbitrate application focus between two simultaneously running client applications.

In some embodiments, the distribution and synchronization service may be a persistent background process. The distribution and synchronization service may be analogous to a device driver, for example, for a typical 2D display device and adapter. Rather than being launched alongside a specific application, the distribution and synchronization service may be launched during the workstation's boot process and run for the duration of the workstation's running session. Client applications and rendering node applications may connect and disconnect at will.

In some embodiments, rather than organizing a network graph that provides direct communication between components, the distribution and synchronization service may be a transport gateway between client applications, thus enabling the distribution and synchronization service to take the role of optimizing and accounting for data transport so that components may be lightweight and be able to inspect data transmissions and provide appropriate support functionality when needed.

Figure 1:
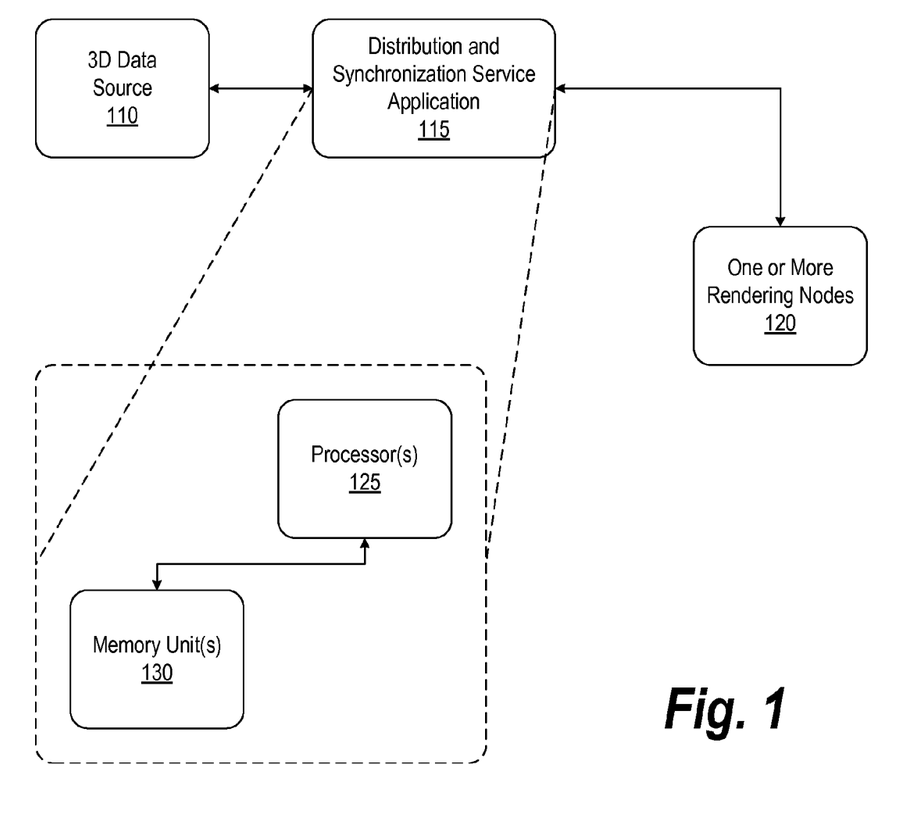
FIG. 1 is a block diagram illustrating a system for converting 3D data to hogel data, in accordance with some embodiments.

FIG. 1 is a block diagram illustrating a system for converting 3D data to hogel data, in accordance with some embodiments.

3D data source 110 is configured to provide and/or generate 3D data and/or commands. In some embodiments, the 3D data source 110 may provide computer graphics 3D data/commands in specific graphics language formats such as in the OpenGL or DirectX graphics language. In other embodiments, other types of 3D may be provided and/or generated by 3D data source as described, for example, above.

Distribution and synchronization service 115 is configured to receive the 3D data/commands and to distribute the 3D data/commands to one or more rendering nodes 120. In some embodiments, the distribution and synchronization service 115 is configured to provide an interface between 3D data source 110 and one or more rendering nodes 120. Distribution and synchronization service 115 may be, for example, configured to synchronize the data transfer and processing between one or more rendering nodes 120 and 3D data source 110.

In some embodiments, distribution and synchronization service 115 may comprise one or more processors 125 and one or more memory units 130 coupled to one or more processors 125. In some embodiments, one or more processors 125 and one or more memory units 130 are configured to implement the functionality of distribution and synchronization service 115. In other embodiments, one or more processors 124 and one or more memory units 130 may be configured to implement the functionality of the whole system, including the functionality of one or more rendering nodes 120.

In some embodiments one or more rendering nodes 120 may be configured to receive a subset of the 3D data from distribution and synchronization service 115 and to render the subset of the 3D data into hogel data. In embodiments where the 3D data is computer 3D graphics data, one or more rendering nodes 120 may include one or more GPUs and other graphics units that are configured to render the 3D data into the multiple 2D views of the hogel data. The GPUs may be used in parallel and/or in series to accomplish the rendering of each subset of the 3D data. First, portions of each subset of hogel data may be assigned to each GPU. Upon completion of the first portions of hogel data, second portions of hogel data may be assigned to each GPU, etc. until the subset of hogel data assigned to the rendering node has been completed. Generally, one or more rendering nodes 120 may be each configured to convert multiple types of 3D data into a subset of the hogel data.

In some embodiments, when each rendering node completes rendering the subset of hogel data assigned to that rendering node, each rendering node is configured to issue a rendering complete or a "ready" command to indicate the completion. In some embodiments, the distribution and synchronization service 115 may be configured to receive the rendering complete commands issued by each of the rendering nodes, and in response, distribution and synchronization service 115 may be configured to issue an "all rendering complete" command to the rendering nodes. In some embodiments, the rendering nodes may, for example, wait for such a command before outputting/forwarding the rendered hogel data substantially simultaneously to a hogel light modulator or other device.

In some embodiments, distribution and synchronization service 115 may also be configured to forward the "all rendering complete" command to the 3D data source in order to enable 3D data source 110 to send additional 3D data/commands (corresponding to the next frame, for example) to distribution and synchronization service 115.

In some embodiments, one or more rendering nodes 120 may also be configured to issue "forwarding/output complete" commands to distribution and synchronization service 115 in response to the rendering nodes completing the outputting/forwarding of rendered hogel data to another device, such as a hogel light modulator, for example. In some embodiments, distribution and synchronization service 115 may be configured to receive the "forwarding complete" commands from the rendering nodes and to issue an "all forwarding complete" command to the 3D data source 110 in response to receiving "forwarding complete" commands from all the rendering nodes. In some embodiments, 3D data source 110 may be configured to send additional 3D data to distribution and synchronization service 115 in response to receiving the "all forwarding complete" command from the distribution and synchronization service. In some embodiments, 3D data source 110 may send additional 3D data (such as the next frame of 3D data, for example) in response to either receiving the "all rendering complete" command or the "all outputting/forwarding complete" command.

Figure 2:
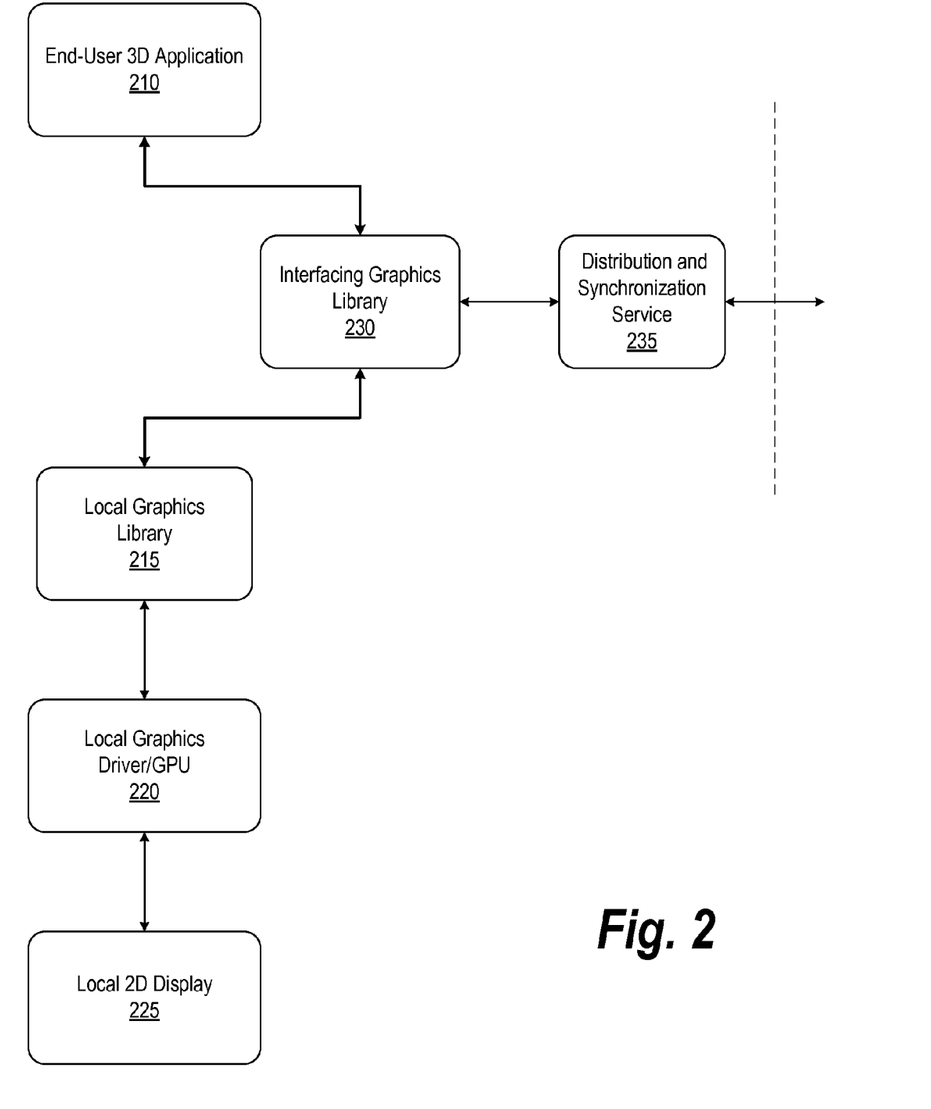
FIG. 2 is a block diagram illustrating a system for intercepting graphics library commands issued by a 3D end-user application, in accordance with some embodiments.

FIG. 2 is a block diagram illustrating a system for intercepting graphics library commands issued by a 3D end-user application, in accordance with some embodiments.

In some embodiments, end-user 3D application 210 may be any application running on a client computer configured to provide 3D content. The 3D content may be intended, for example, for rendering and displaying a particular 2D view on a 2D display attached to the client computer. End-user 3D application 210 may be a video game, a 3D scenery program, a 3D design program, etc. In some embodiments, end-user 3D application 210 may be configured to call local graphics library 215 using 3D data/graphics language commands. Graphics library 215 may be configured to processes the commands/3D data and forward the commands to local graphics driver/GPU 220. In some embodiments, local graphics driver/GPU 220 is configured to render the 3D data into a 2D view that may then be displayed on local 2D display 225.

In some embodiments, interfacing graphics library 230 is configured to intercept 3D data/graphics language commands intended for local graphics library 215. In some embodiments, this may be accomplished by setting interfacing graphics library 230 as the default graphics library for a particular protocol, such as OpenGL or Direct3X, on the client workstation where end-user 3D application 210 may be running. Accordingly, graphics commands of the particular protocol are by default routed to interfacing graphics library 230 instead of to local graphics library 215.

In some embodiments, interfacing graphics library 230 may be configured to forward a copy of the graphics language commands and 3D data to distribution and synchronization service 235. Interfacing graphics library 230 may also be configured to forward a copy of the commands to local graphics library 215 for local processing and displaying as described above.

Distribution and synchronization service 235 is configured to forward the 3D data/graphics commands to one or more rendering nodes for the purpose of rendering multiple hogel views (hogel data) from the 3D data and for displaying on a hogel light modulator, for example.

Figure 3:
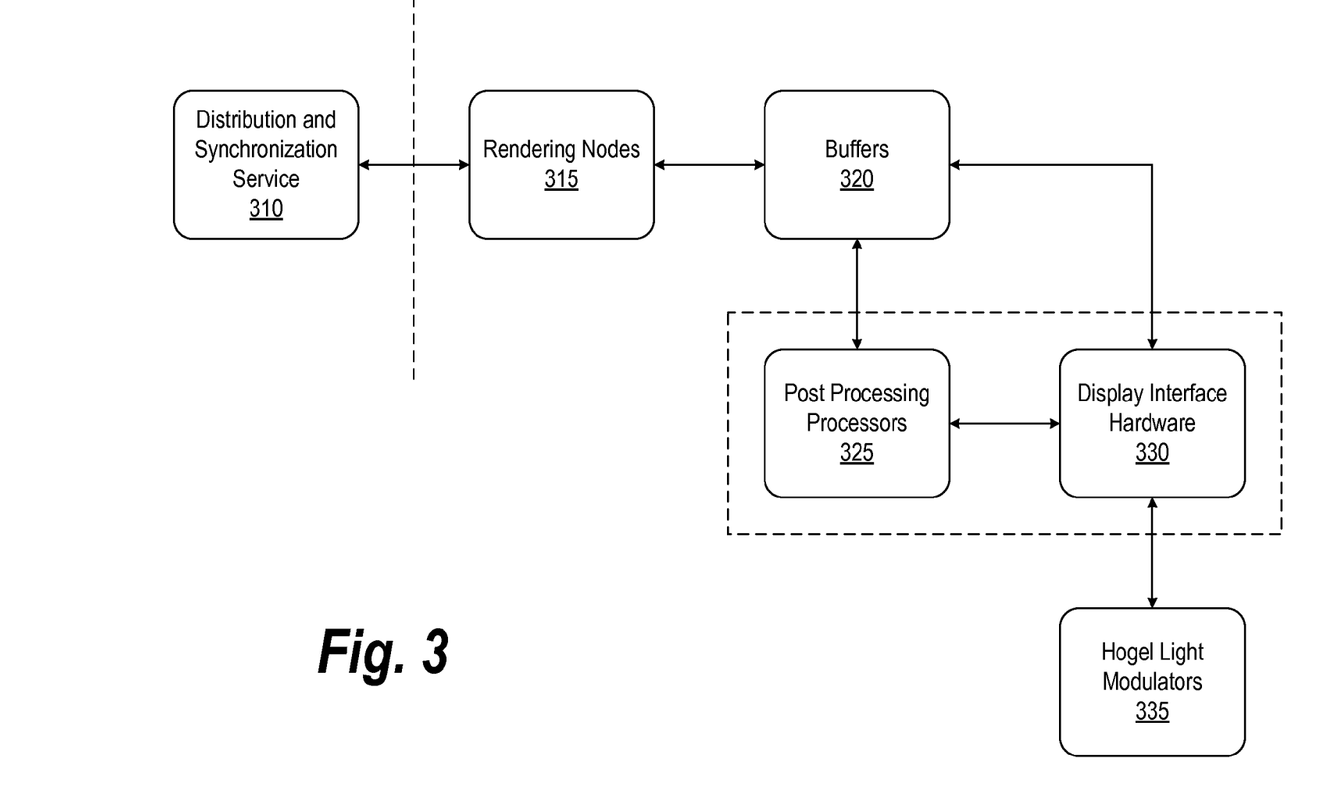
FIG. 3 is a block diagram illustrating a system for controlling distributed rendering of 3D data to hogel data, in accordance with some embodiments.

FIG. 3 is a block diagram illustrating a system for controlling distributed rendering of 3D data to hogel data, in accordance with some embodiments.

Distribution and synchronization service 310 is configured to receive 3D data/graphics commands and distribute the data/commands to one or more rendering nodes such as rendering nodes 315. In addition, distribution and synchronization service 310 may be configured to control and synchronize the rendering process at rendering nodes 315. In some embodiments, the 3D data and graphics commands may be forwarded to rendering nodes 315. In alternative embodiments, only a subset of the 3D data and graphics commands may be sent to each rendering node depending on the hogel data to be rendered by each rendering node.

In some embodiments, rendering nodes 315 are configured to receive the 3D data and graphics commands and generate multiple hogel views—or hogel data. In embodiments where, one or more GPUs may be used per rendering nodes; in other embodiments, one or more rendering nodes may share one GPU; in yet other embodiments, multiple GPUs may be shared by one or more of the rendering nodes. In some embodiments, the rendering process may incorporate double frustum techniques in order to render scenery above as well as below the hogel plane.

After a group of nodes completes rendering a group hogel data, the hogel data may be stored in buffers 320. In some embodiments, when a rendering node completes the rendering, the rendering node informs distribution and synchronization service 310 of the rendering completion. The distribution and synchronization service may wait until all the rendering have reported a rendering completion and then send an all rendering complete command back to the rendering nodes. In some embodiments, buffers 320 are configured to forward the hogel data to display hardware 330 substantially simultaneously and in response to receiving an all rendering complete command from distribution and synchronization service 310.

In some embodiments, the hogel data may be sent to display hardware 330 which is configured to convert the data to the proper format for hogel light modulators 335. Hogel light modulators 335 may use a variety of display technologies such as LCDs, LEDs, etc. in order to generate a 3D image from the hogel data.

Post-rendering processors 325 are configured to perform additional processing on the rendered hogel data. In some embodiments, post-rendering processors 325 are configured, for example, to perform calibration operations on the hogel data as well as other types of processing such as rearranging the data to create an inverted image, a mirror image, etc. The hogel data may be calibrated in terms of the positions of the hogels, the directions of light emerging from the hogels, and the colors and intensities of light emerging from the hogels, for example.

Figure 4:
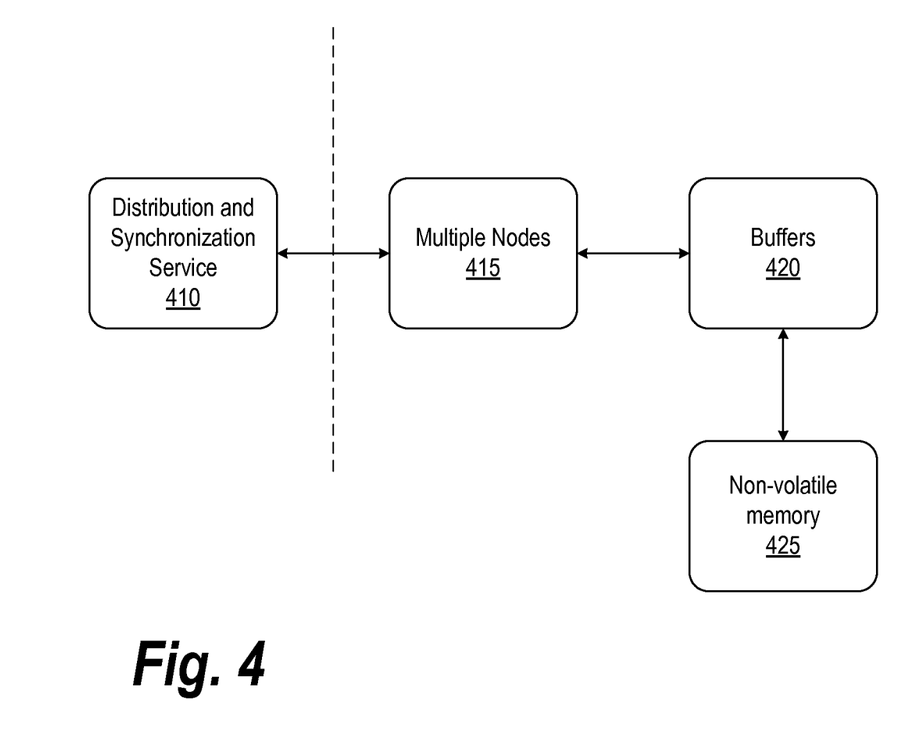
FIG. 4 is a block diagram illustrating a system for recording rendered hogel data, in accordance with some embodiments.

FIG. 4 is a block diagram illustrating a system for recording rendered hogel data, in accordance with some embodiments.

In some embodiments, distribution and synchronization service 410 is configured to receive 3D data/commands and distribute the data/commands to one or more rendering nodes such as rendering nodes 415. In addition, distribution and synchronization service 410 may be configured to control and synchronize the rendering of hogel data by rendering nodes 415. In some embodiments, all the 3D data and/or commands may be forwarded to rendering nodes 415. In alternative embodiments, only a subset of the 3D data/commands may be sent to each rendering node.

Rendering nodes are configured to receive the 3D data and/or commands and generate multiple hogel views—or hogel data for display on hogel light modulator, storage, etc. In embodiments where the 3D data is 3D computer graphics data, one or more GPUs may be used per rendering node or one or more rendering nodes may share one GPU or multiple GPUs may be shared by one or more rendering nodes.

After a rendering node finishes rendering a group of hogel data, the hogel data may be stored in buffers 420 before further processing. In some embodiments, when a rendering node completes the rendering of the hogel data assigned to that rendering node, the rendering node may inform distribution and synchronization service 410 of the rendering completion. The distribution and synchronization service may then wait until all the rendering nodes report a completion of the rendering, and in response, the distribution and synchronization service may send an all rendering complete back to each of the rendering nodes. In some embodiments, the rendering nodes may use the all rendering complete command to then substantially simultaneously send the rendered hogel data from buffers 420 to non-volatile memory 425. The rendered hogel data from one rendering cycle may be assigned to a single video frame and may be stored in non-volatile memory 425 for "playback" at a later time or the hogel data may be forwarded to a hogel light modulator.

Figure 5:
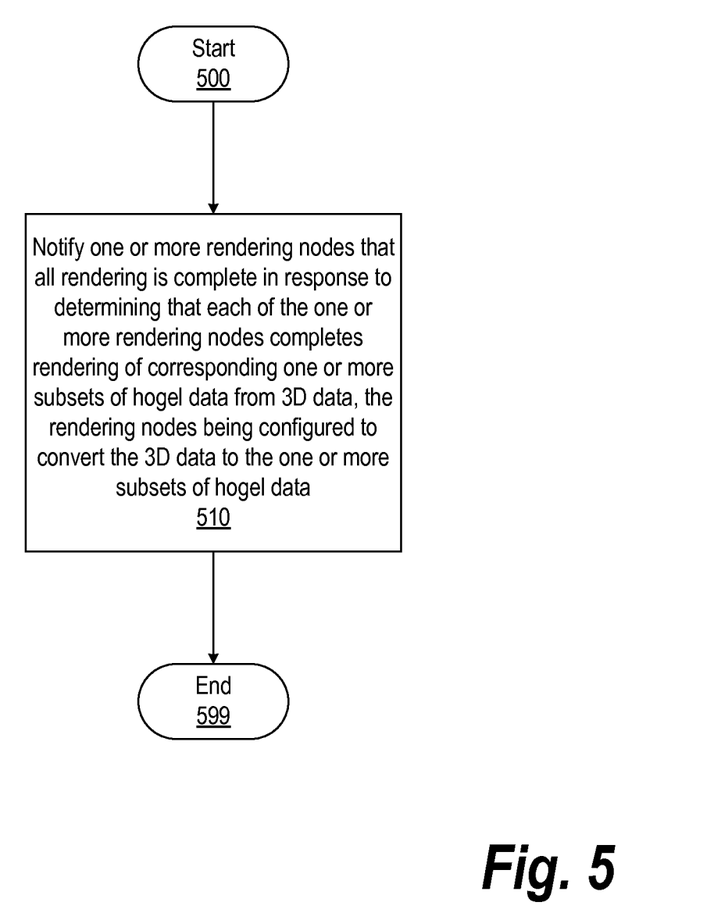
FIG. 5 is a flow diagram illustrating a method for converting 3D data to hogel data, in accordance with some embodiments.

FIG. 5 is a flow diagram illustrating a method for converting 3D data to hogel data, in accordance with some embodiments. It should be noted that, in some embodiments, the methods described here may be performed by the system described in FIG. 1 though FIG. 4.

Processing begins at 500 where, at block 510, one or more rendering nodes are notified that all rendering is complete in response to determining that each of the one or more rendering nodes completes rendering of corresponding one or more subsets of hogel data from 3D data, the rendering nodes being configured to convert the 3D data to the one or more subsets of hogel data. Processing subsequently ends at 599.

Figure 6:
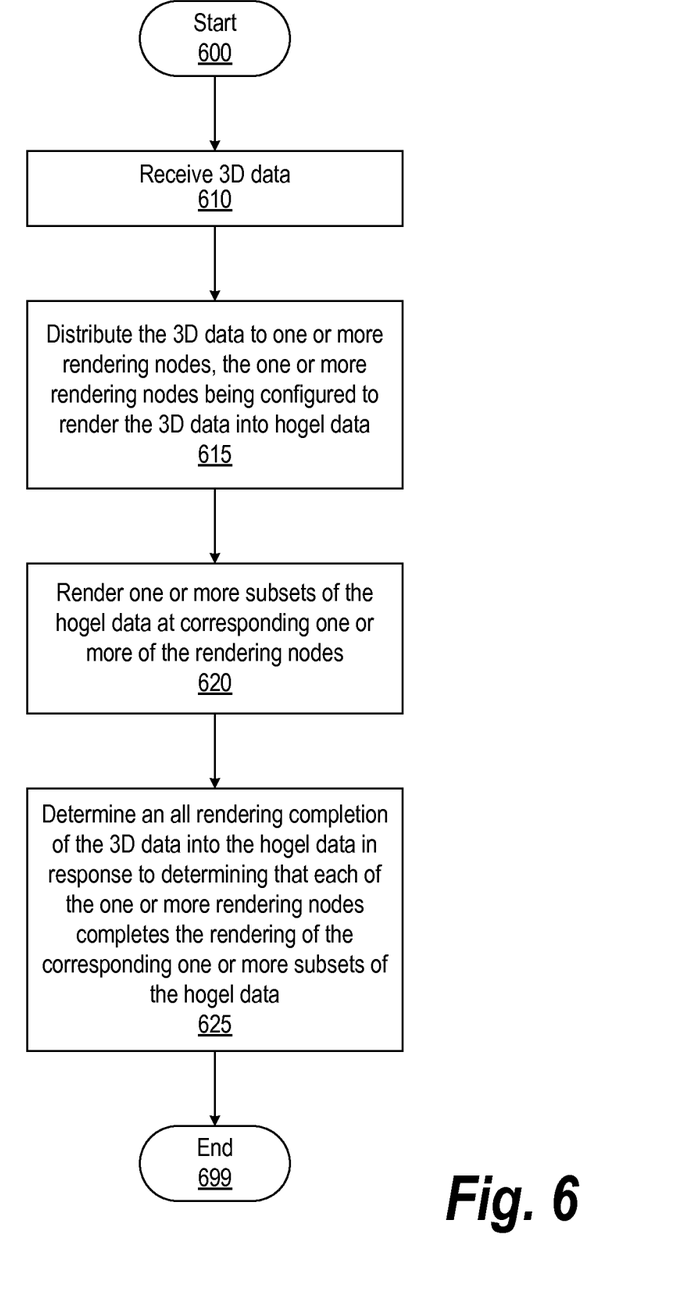
FIG. 6 is a flow diagram illustrating an alternative method for converting 3D data to hogel data, in accordance with some embodiments.

FIG. 6 is a flow diagram illustrating an alternative method for converting 3D data to hogel data, in accordance with some embodiments. It should be noted that, in some embodiments, the methods described here may be performed by the system described in FIG. 1 though FIG. 4.

Processing begins at 600 where, at block 610, 3D data is received. In some embodiments, 3D data/commands may be 3D graphics data/commands and may be provided in specific graphics language formats such as OpenGL or DirectX. The 3D data/commands may originate from a variety of sources. In some embodiments, the 3D data may be intercepted from a 3D application executing on a workstation and communicating with a local graphics library. The 3D application may or may not be aware that the 3D data/commands generated by the application are being intercepted. In some embodiments, the 3D application may be generating data for rendering views for displaying on traditional 2D displays, for example. In other embodiments, the 3D application may be configured to generate 3D data/commands for the purpose of rendering the 3D data/commands into hogel data.

At block 615, the 3D data is distributed to one or more rendering nodes. In some embodiments, the rendering nodes may be configured to render 3D data into hogel data. At block 620, one or more subsets of the hogel data are rendered at corresponding one or more of the rendering nodes. In some embodiments, each of the rendering nodes is configured to render a subset of the hogel data. Each of the rendering nodes may, for example, include one or more GPUs, and may render a subset of the hogel data by using the GPUs either in series and/or in parallel.

At block 625, an all rendering completion of the 3D data into the hogel data is determined. In some embodiments, the determination may be accomplished in response to determining that each of the one or more rendering nodes completes the rendering of corresponding one or more subsets of the hogel data. For example, each of the rendering nodes may issue a rendering complete, and in response to each of the rendering nodes issuing the all rendering complete command, the rendering nodes may be notified that all is complete.

Figure 7:
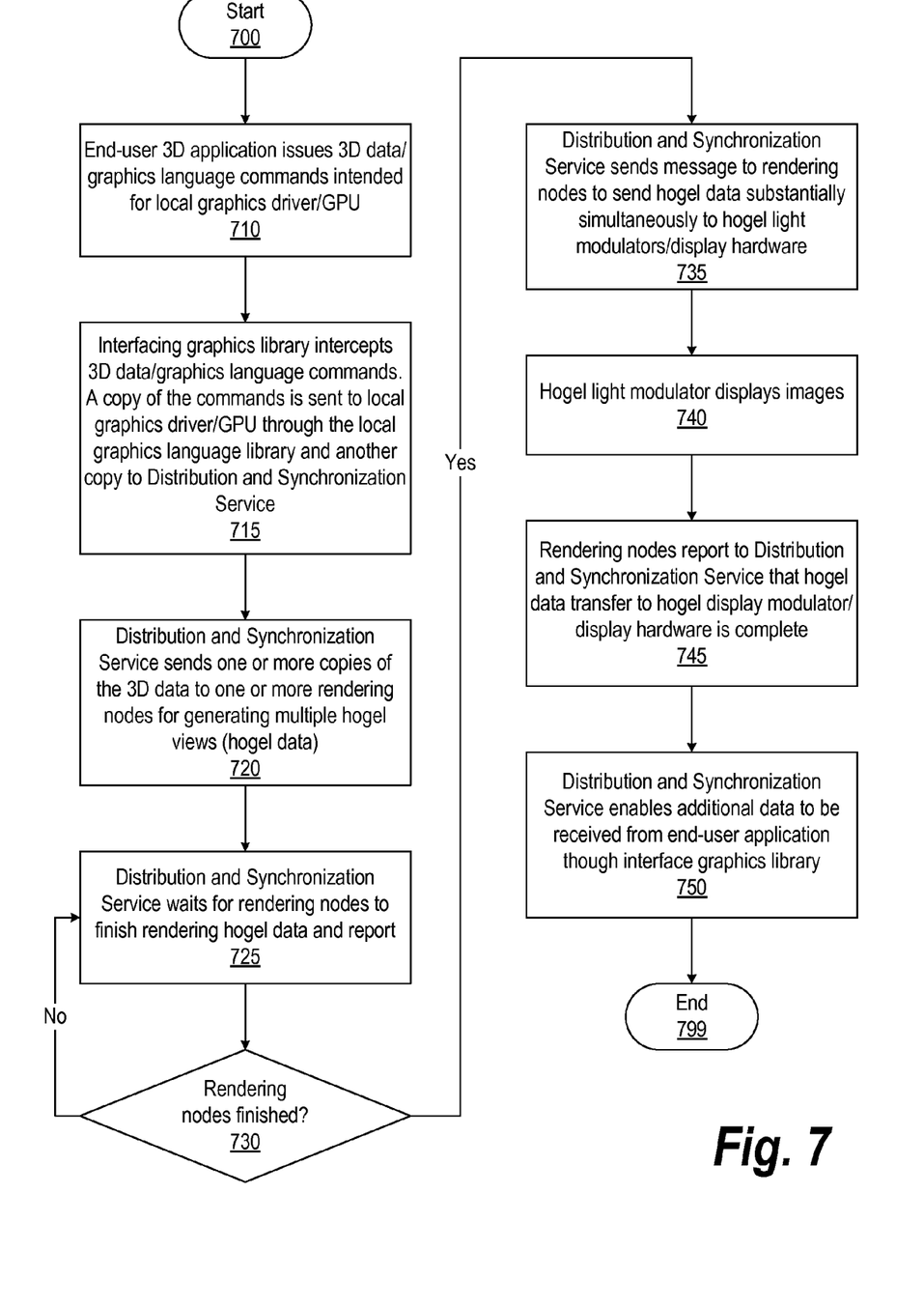
FIG. 7 is a flow diagram illustrating a method for intercepting 3D data, rendering the 3D data into hogel data, and displaying the hogel data, in accordance with some embodiments.

FIG. 7 is a flow diagram illustrating a method for intercepting 3D data, rendering the 3D data into hogel data, and displaying the hogel data, in accordance with some embodiments. It should be noted that, in some embodiments, the methods described here may be performed by the system described in FIG. 1 though FIG. 4.

Processing begins at 700 where, at block 710, end-user 3D application issues 3D data/graphics library commands intended for local driver/GPU for the purpose of displaying a 2D view on a 2D display.

At block 715, an interfacing graphics language library is configured to intercept the 3D data and graphics language commands issued by the end-user graphics application. In some embodiments, this may be accomplished by setting the interfacing graphics language library as the default library for the particular graphics language being used—such as OpenGL and DirectX. A copy of the 3D data/commands is thereby sent to the distribution and synchronization service, and in addition, a copy may also be sent to the local graphics library for local processing and displaying on the local 2D display.

At block 720, the distribution and synchronization service forwards one or more copies of the 3D data/graphics commands to one or more rendering nodes. In some embodiments, each of the rendering nodes may be configured to render a portion of the hogel data.

At block 725, distribution and synchronization service waits for the rendering nodes to report that each has completed the rendering of the hogel data. A determination is then made, at decision 730, as to whether the rendering nodes have completed the rendering. If not all the rendering nodes have yet finished, decision 730 branches to the "no" branch where processing returns to block 725.

On the other hand, if all the rendering nodes report that all the rendering has finished, decision 730 branches to the "yes" branch where, at block 735, distribution and synchronization service sends a message to the rendering nodes that all rendering is complete. In response to receiving the all rendering complete command, the one or more rendering nodes, may then substantially simultaneously output the rendered hogel data to the hogel light modulators/display hardware for displaying a 3D image from the hogel data. At block 740, the hogel light modulators, in some embodiments with the help of a display hardware interface, displays the 3D image frame.

At block 745, the rendering nodes report to distribution and synchronization service that the hogel data output/transfer to hogel light modulator is complete. At block 750, the distribution and synchronization service may notify a 3D data source that the output of the hogel data is complete, thereby enabling additional data to be received from the 3D data source/end-user application through the interfacing graphics library. In some embodiments, the additional data may correspond to the next 3D video frame.

Processing ends at 799.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for rendering hogels, wherein the method is configured to be executed by one or more processors coupled to one or more memory units, the method comprising:

notifying one or more rendering nodes that all-rendering-is-complete based at least in part on determining that each of the one or more rendering nodes completes rendering of corresponding one or more subsets of hogel data from 3D data, wherein the rendering nodes are configured to convert the 3D data to the one or more subsets of hogel data, wherein the notifying is being performed by the one or more processors;

causing the one or more rendering nodes to output the corresponding one or more subsets of hogel data based at least in part on notifying the one or more rendering nodes that all-rendering-is-complete;

determining that all output is complete based at least in part on determining that the one or more rendering nodes outputs the corresponding one or more subsets of hogel data;

receiving a temporal frame of the 3D data from a 3D data source;

distributing the temporal frame of the 3D data to the one or more rendering nodes;

receiving an end-of-temporal-frame command from the 3D data source;

distributing the end-of-temporal-frame command to the one or more rendering nodes; and notifying the 3D data source that all-output-is-complete based at least in part on determining that all output is complete.

2. The method of claim 1, wherein receiving 3D data comprises intercepting 3D data graphics commands issued by a 3D application running on a workstation.

3. The method of claim 1, wherein receiving 3D data comprises sequentially receiving a stream of 3D data corresponding to sequential video temporal frames.

4. The method of claim 1, wherein distributing the 3D data comprises distributing only a relevant portion of the 3D data to each of the one or more rendering nodes.

5. A system for rendering hogels, the system comprising:
one or more processors;
one or more memory units coupled to the processor, the system being configured to:
notify one or more rendering nodes that all-rendering-is-complete based at least in part on determining that each of the one or more rendering nodes completes rendering of corresponding one or more subsets of hogel data from 3D data, wherein the rendering nodes are configured to convert the 3D data to the one or more subsets of hogel data;

cause the one or more rendering nodes to output the corresponding one or more subsets of hogel data based at least in part on notifying the one or more rendering nodes that all-rendering-is-complete;

determine that all output is complete based at least in part on determining that the one or more rendering nodes outputs the corresponding one or more subsets of hogel data;

receive a temporal frame of the 3D data from a 3D data source;

distribute the temporal frame of the 3D data to the one or more rendering nodes;

receive an end-of-temporal-frame command from the 3D data source;

distribute the end-of-temporal-frame command to the one or more rendering nodes; and notify the 3D data source that all-output-is-complete based at least in part on determining that all output is complete.

6. The system of claim 5, where receiving 3D data comprises sequentially receiving a stream of 3D data corresponding to sequential video temporal frames.

7. The system of claim 5, where the system being configured to distribute the temporal frame of 3D data comprises the system being configured to distribute only a relevant potion of the 3D data to each of the one or more rendering nodes.

8. A computer program product stored on a non-transitory computer operable medium, the computer program product comprising software code being effective to:

notify one or more rendering nodes that all-rendering-is-complete based at least in part on determining that each of the one or more rendering nodes completes rendering of corresponding one or more subsets of hogel data from 3D data, wherein the rendering nodes are configured to convert the 3D data to the one or more subsets of hogel data;

cause the one or more rendering nodes to output the corresponding one or more subsets of hogel data based at least in part on notifying the one or more rendering nodes that all-rendering-is-complete;

determine that all output is complete based at least in part on determining that the one or more rendering nodes outputs the corresponding one or more subsets of hogel data;

receive a temporal frame of the 3D data from a 3D data source;

distribute the temporal frame of the 3D data to the one or more rendering nodes;

receive an end-of-temporal-frame command from the 3D data source;

distribute the end-of-temporal-frame command to the one or more rendering nodes; and notify the 3D data source that all-output-is-complete based at least in part on determining that all output is complete.

9. The product of claim 8, wherein the code being effective to receive 3D data comprises the code being effective to receive sequentially a stream of 3D data corresponding to sequential video temporal frames.

10. The product of claim 8, wherein the code being effective to distribute the temporal frame of 3D data comprises the code being effective to distribute only a relevant potion of the 3D data to each of the one or more rendering nodes.

* * * * *